June 12, 1956 E. I. ANDERSON 2,750,534

TELEVISON RECEIVER

Filed Aug. 16, 1952

INVENTOR.
Earl I. Anderson

BY [signature]

ATTORNEY 2,750,534
Patented June 12, 1956

2,750,534

TELEVISION RECEIVER

Earl I. Anderson, Port Washington, N. Y., assignor to Radio Corporation of America, a corporation of Delaware Application August 16, 1952, Serial No. 304,767

15 Claims. (Cl. 315—22)

The present invention relates to new and useful improvements in television receiver horizontal deflection circuits of the electromagnetic type.

More particularly, the invention relates to an improvement in the horizontal deflection yoke circuitry, in conjunction with certain phenomena in such circuit, as it affects the raster pattern appearing on the face of the kinescope of cathode ray tube of the receiver.

Certain non-linearities in the sawtooth current drawn through the horizontal deflection coils results in a non-uniform scanning rate, producing alternate dark and bright vertical bands on the left side of the raster pattern. These bands or stripes, are completely dissociated from the incoming video signals which are intended to cause intensity modulation of the cathode ray beam to effect the production of an image pattern on the luminescent screen of the kinescope, and are thus extremely objectionable.

It is, therefore, a primary object of the present invention to provide means for eliminating such alternate dark and bright bands from the scapping raster.

Various schemes have been devised in the attempt to remove the objectionable bands from the raster, most of them being rather complex methods involving drastic changes in the horizontal deflection circuits. These systems, therefore, are subject to the objection of being expensive and, furthermore, of providing additional sources of design difficulty.

Another object of the invention is to provide means for the elimination of the vertical bands, which means does not require any changes in the conventional circuitry of the horizontal deflection system and which may be accomplished by an addition of inexpensive circuit elements to existing circuits.

As stated supra, the vertical bands result from certain non-linearities in the current in the horizontal deflection coils. More particularly, since the deflection coils comprise both a resistive and an inductive impedance, it is necessary, in order for a sawtooth current to be produced in the coils, that a voltage waveform consisting of both a sawtooth wave and pulses be applied to the coils. In practice, it is extremely difficult to maintain such a waveform with absolute linearity and, as is known, a portion of the sawtooth wave is actually a high frequency ripple. This is particularly true in sets employing reaction scanning, despite the employment of conventional damping means. The sawtooth current in the coils also contains a non-linear, high frequency ripple which causes a non-uniform horizontal deflection. Such non-uniform deflection of the cathode ray beam causes what may be termed "velocity modulation" of the scanning beam; that is, the beam, while being deflected by current from the damper tube, traverses the face of the kinescope more rapidly for some portions of its travel than for other portions. Since the brightness of any given spot on the kinescope screen is proportional to the length of time that such spot is bombarded by electrons, the net effect is the production of alternate dark and bright areas of stripes in each scanned line corresponding to an increase or reduction of the deflection velocity for that line.

In view of the above analysis of the problem and its source, most efforts toward correction have been directed to elimination of the ripple or high frequency component from the sawtooth current drawn through the deflection coil which, of course, gives rise to extreme complexity in the wave-forming circuits.

Hence, it is a further object of the invention to provide means for counteracting or neutralizing the effects in the deflection coils of non-linearity of the current passed through the coils, which means employs the non-linearities as a neutralizing force.

One may deduce from the above statements the fact that the non-uniformity of scanning rate (i. e. velocity modulation of the deflection rate) is proportional to the non-linearity (i. e. high frequency ripple component) of the sawtooth current. It is further deducible that the rate of change of current is proportional to that in the voltage impressed upon the deflection coils and it is a fact that the brightness of any spot on the kinescope screen is proportional to the magnitude of the electron flow or current in the tube which produces that spot. The present invention, therefore, comprises generally the application of the ripple component of the voltage across the coils to a control electrode in the kinescope to vary the magnitude of its current flow in such a fashion as to neutralize the brightness effects of the objectionable "velocity modulation." More specifically, the above mentioned purposes and other aims of the invention are accomplished by a coupling of the voltage across the deflection coils to a control electrode in the cathode ray tube.

Other purposes and advantages of the invention will become apparent to persons skilled in the art from a study of the following detailed description of the attached drawings, in which.

Figures 1, 2, 3:
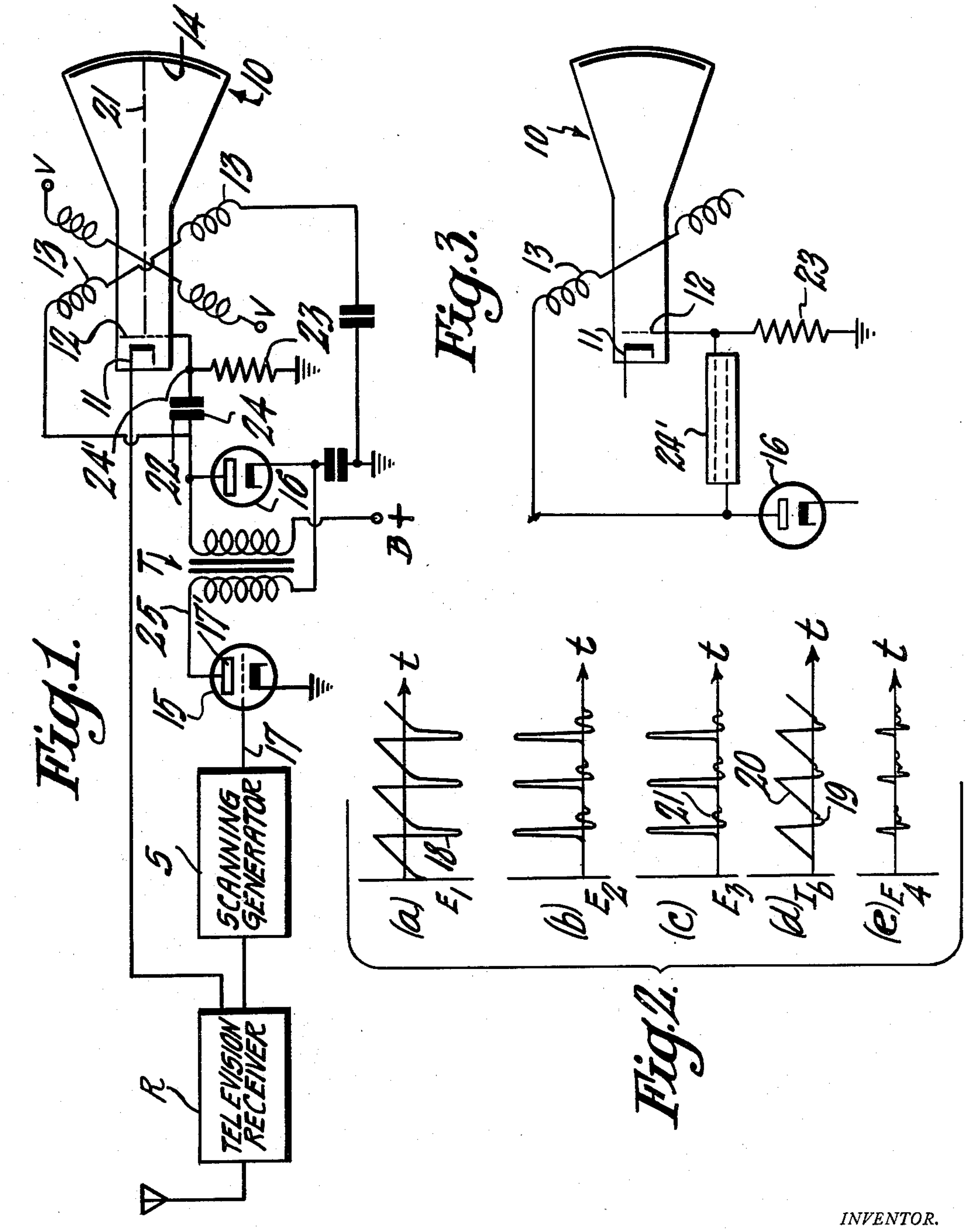
Fig. 1 is a simplified schematic circuit diagram illustrating an embodiment of the invention and showing the horizontal deflection coils and the circuit elements employed in conjunction therewith.
Figs. 2 (*a–e*) illustrate a series of waveforms to be referred to in the discription of the invention.
Fig. 3 illustrates a specific form of the invention.

Referring to the drawings, Fig. 1 illustrates schematically a television receiver "R." As is known, the incoming signal, comprising video and sync signals, is picked up by the receiver section, shown diagrammatically, from which the video signal is derived for application to the kinescope, while the sync pulses are employed in the operation of the scanning generator and other circuits to be described. More, particularly, reference numeral 10 indicates generally a cathode ray tube or kinescope having a cathode 11 and a control electrode 12, which two elements are well-known parts of a conventional kinescope. Associated with the tube are horizontal deflection coils 13 which are adapted to cause rapid deflection of the cathode ray beam horizontally across the luminescent screen 14.

A horizontal driver tube 15 is coupled by means of transformer "T" to the horizontal deflection coils 13, in a conventional manner. Disposed across the secondary of the transformer "T" is a diode damper tube 16, the function of which will be described herein-below.

In order for the horizontal deflection of the electron beam in the kinescope to be conducted at a constant rate, it is necessary that the current passing through the horizontal deflection coils 13 be a sawtooth current, that is a current wave form having a linearly rising leading edge of a slope determined by the rate of traverse desired, with a rather sharply sloped trailing edge which causes the rapid retrace of the scanning beam from the end of one line to the beginning of the succeeding scanning line. Since the deflection coils have both a resistive and an inductive impedance, the voltage impressed upon the horizontal deflection coils must consist of pulses for the production of the sawtooth current through the inductive impedance as well as a sawtooth component which will result in a sawtooth current through the resistance.

A suitable voltage $E_1$ such as that shown in Figure 2*a* is produced by conventional means such as a scanning generator indicated schematically in Fig. 1 and is impressed upon the grid 17 of the horizontal driver tube 15.

Examples of some basic types of scanning, or horizontal sweep, generators may be found in the book, "Principles of Television Engineering" by Donald G. Fink, published by McGraw-Hill Book Company, Inc., 1940, Chapter IV.

The voltage $E_1$ is amplified by the horizontal driver tube 15, resulting in the wave form $E_2$ at the plate 17' of tube 15. When tube 15 is driven into cutoff by the sharp negative pulse 18 of wave form $E_1$, the sudden cessation of plate current shock-excites the output circuit, including the output transformer "T" and the deflection coils 13 with their associated inter-lead capacitances, into oscillation, such oscillation being in the neighborhood of 75 kilocycles. Unless some provision were made to damp out the train of oscillations, the circuit would continue to oscillate, thus causing the electron beam to sweep back and forth across the screen before finally coming to rest at the center thereof. It is for this purpose that the damper tube 16 is conventionally included, its operation being described at pages 152 and 153 of the above-cited Fink textbook. Briefly, such operation is as follows: When the tube 15 is driven into cutoff, the plate current of the tube stops and the field around transformer "T" collapses, the voltage induced thereby causes the plate of damper tube 16 to become negative. With the plate of tube 16 negative, oscillations such as those described will take place, since the tube 16 will then be non-conducting. Since, by virtue of the inductance of the circuit the voltage leads current by 90°, when the current through the deflection coils 13 has reached its negative peak the voltage at the plate of diode 16 will become positive, at which point the diode begins to conduct, thus resulting, in effect, in placing a low resistance path across the tuned circuit. The low resistance path described results in a damping of the oscillations, causing the current to approach zero value exponentially. If the circuit remained in a status quo, the current waveform, rather than being linear as required, would be in the form of a logarithmic curve. This, however, is prevented by the fact that, before the current through the diode plate circuit reaches zero, the driver tube 15 will have begun to conduct once again because of the positive component of the wave form $E_1$ applied to its grid. The plate current then drawn by the driver tube 15 will, in effect, take up from the point where the current through the diode had begun approaching zero, thus giving a resultant or composite current through the deflection coils of the form depicted in Figure 2*d*.

As illustrated by the latter figure, the portion of the current wave form which is attributable to the action of the damper diode 16 is somewhat rippled, as indicated by reference numeral 19, since the damping action of the diode 16 is not completely effective. The remainder of the rising portion (indicated at 20) of the current wave form $I_D$, is linear, by virtue of the characteristics of driver tube 15.

Persons skilled in the art will appreciate the fact that the high frequency ripple component of the rising portion of the current wave form of Figure 2*d* produces a non-uniform electro-magnetic field when it passes through the deflection coils 13. Such non-linearity in the magnetic field results in a varying deflection rate. More specifically, the leading edge of the first ripple will produce through the increased flux a greater deflection velocity, while the trailing edge of the ripple causes a diminution of such deflection velocity. Since the brightness of the spot produced on the luminescent screen 14 by the electron beam 21 which travels from the cathode 11 is inversely proportional to the speed at which the beam has been made to traverse that spot, it will be apparent that the alternate speeding up and slowing down of the original deflection rate results in alternate darker and lighter spots respectively, along the scanning line. This effect, known as "ringing" is extremely objectionable and, therefore, the present invention provides means for eliminating such "ringing."

Referring to Figure 2*c* of the drawings, it will be seen that the voltage wave form $E_3$ appearing across the deflection coils 13 includes a ripple component indicated at 21 which corresponds to the ripple 19 in the current wave form in Figure 2*d*. The present invention contemplates the application of the ripple component 21 of the voltage $E_3$ across the deflection coils to control grid 12 of the kinescope. By virtue of the fact that the intensity of the spot on the luminescent screen 14 is proportional to the intensity of the electron beam 21 as it bombards that spot, the alternating voltage 21, when applied to control electrode 12 will vary the intensity of the electron beam 21, thereby varying the intensity of the light emanating from the screen 14 at that spot. Such variation resulting from the ripple voltage on control grid 12 is sufficient to neutralize the brightness effect of the "velocity modulation" which is attributable to the ripple component 19 of the sawtooth current drawn through the deflection coils 13.

Assuming, therefore, for a given point on the screen 14 that the ripple 19 of the current wave form $I_D$ has caused an increase in the deflection velocity with a resulting decrease in illumination for the spot, the corresponding portion of the ripple 21 of voltage wave form $E_3$ will render the control electrode of the kinescope more positive, thus increasing the intensity of the electron beam and neutralizing the effect of the "velocity modulation."

The ripple voltage 21 is applied to the control electrode 12 by means of a coupling 22 which is provided with an extremely small capacitance 24, in the neighborhood of 4 micromicrofarads, so that only the high frequency ripple component of wave form $E_3$ is applied to the control electrodes 12. A resistor 23 is connected between coupling 22 at point 24' and ground, voltage 21 appearing across this resistor.

In practice, it has been found that a suitable length of twin lead transmission line such as that indicated by reference numeral 24' in Fig. 3 serves admirably as the coupling 22. A 6¾ inch length of 300 ohm twin lead transmission line provides the necessary low capacitance 24 indicated schematically in the drawings (Fig. 1).

More specifically, Fig. 2*e* shows the voltage wave form $E_4$ which is the ripple component of wave form $E_3$ (Fig. 2*c*) applied to control electrode 12.

In operation, a voltage wave form such as is illustrated in Fig. 2*a* is applied to the control grid 17 of horizontal driver tube 15, resulting in a voltage wave form in the plate circuit 25 of the driver tube having the shape of wave form $E_2$ (Fig. 2*b*).

By virtue of the action of the diode 16 located across the secondary of the coupling transformer "T," together with the action of the driver tube 15 as set forth supra, the voltage wave form illustrated in Fig. 2*c* is impressed upon the deflection coils 13, resulting in a current through such coils having the shape of wave form $I_D$ (Fig. 2*d*). The ripple component 19 of current $I_D$ would ordinarily produce velocity modulation of the scanning beam and the attendant objectionable alternate dark and light stripes on the raster. By virtue of the coupling 22 and its capacitance 24, the ripple voltage shown in Fig. 2e is applied across resistor 23 to control electrode 12 to neutralize the velocity modulation by alternately increasing and decreasing the intensity of the electron beam in response to increase and decrease of the scanning rate. The net effect is that of a substantially uniform light intensity along the length of the horizontal scanning lines on the screen 14. It will further be noted that the curve of Fig. 2e shows the presence of sharp vertical spikes caused by the differentiation of the return time pulses. These spikes, however, occur during the return time and are blanked out, thus are not objectionable.

The neutralizing effect brought about through the use of the capacitive coupling described herein has been illustrated by its action in compensating for the ripple component of the deflection current which is introduced by the damper diode 16. It is to be borne in mind, however, that the brightness effect of any non-linearity in the deflection voltage, regardless of its source, will be compensated for or neutralized by the invention in a similar manner.

While the capacitive coupling of the present invention has been described as comprising a length of transmission line, it will be appreciated by those skilled in the art that an ordinary capacitor of suitable value may be employed in a simple wire connection between the points in question.

Other modifications contemplated are the application of the video signal to the control electrode, in which event the "neutralizing" signal of the invention may be applied either to the control electrode or to the cathode. Further modifications within the scope of the instant invention will also become apparent and, therefore, the specific embodiment is not to be construed as limiting.

Having thus described my invention, what I claim as new and desire to secure by Letters Patent is:

1. A television receiver comprising a cathode ray tube having a control electrode; electromagnetic means for deflecting an electron beam in said tube; means for applying an electrical waveform of predetermined wave shape to said deflecting means, whereby said deflecting means may be caused to deflect said electron beam at a predetermined rate; and coupling means for applying only a selected portion of the voltage corresponding to departures of said waveform from said wave shape to said control electrode, whereby the intensity of said electron beam may be varied in proportion to the voltage applied to said control electrode.

2. A television receiver comprising a cathode ray tube having a control electrode; electromagnetic means for deflecting an electron beam in said tube; means for applying an electrical waveform of predetermined wave shape to said deflecting means, whereby said deflecting means may be caused to deflect said electron beam at a predetermined rate; and coupling means for applying only a selected portion of the voltage corresponding to departures of said waveform from said wave shape to said control electrode, whereby the intensity of said electron beam may be varied in proportion to the voltage applied to said control electrode, said last-named means including a small capacitance, whereby only high frequency components of said voltage are applied to said control electrode.

3. A receiver as defined by claim 2 wherein said capacitance comprises the inter-lead capacitance of said coupling means.

4. A receiver as defined by claim 2 wherein said coupling means comprises a length of twin-lead transmission line.

5. A television receiver comprising a cathode ray tube having a luminescent screen; means for generating an electron beam in said tube; means for varying the intensity of said electron beam in accordance with video image signals impressed upon said tube; electromagnetic coil means for deflecting said electron beam across said screen; means for causing a substantially sawtooth current waveform to pass through said deflection coils, whereby to deflect said electron beam at a uniform rate across said screen to produce a line of substantially uniform intensity on said screen during an absence of incoming image signal, said deflection rate being dependent for its uniformity upon the linearity of said sawtooth current; and means for coupling said deflection coil to said control electrode to apply to said electrode only a portion of the voltage appearing across said coils, said portion comprising departures of such voltage from such sawtooth waveform, whereby the intensity of said electron beam impinging on said screen is adapted to be varied in accordance with the voltage applied to said control electrode.

6. A television receiver comprising a cathode ray tube having a luminescent screen; means for generating an electron beam in said tube; means for varying the intensity of said electron beam in accordance with video image signals impressed upon said tube; electromagnetic coil means for deflecting said electron beam across said screen; means for causing a substantially sawtooth current waveform to pass through said deflection coils, whereby to deflect said electron beam at a uniform rate across said screen to produce a line of substantially uniform intensity on said screen during an absence of incoming image signal, said deflection rate being dependent for its uniformity upon the linearity of said sawtooth current; and means for coupling said deflection coil to said control electrode to apply to said electrode only a portion of the voltage appearing across said coils, said portion comprising departures of such voltage from such sawtooth waveform, whereby the intensity of said electron beam impinging on said screen is adapted to be varied in accordance with the voltage applied to said electrode, said coupling means including a small capacitance, whereby only high frequency components of the voltage across said coils are applied to said control electrode.

7. A receiver as defined by claim 6 wherein said capacitance comprises the inter-lead capacitance of said coupling means.

8. A receiver as defined by claim 6 wherein said coupling means comprises a length of twin-lead transmission line.

9. In a television receiver having a cathode ray tube provided with an electron beam source, a control electrode, a luminescent screen adapted to produce light when bombarded by an electron beam from said source, and electromagnetic coil means adapted to deflect said beam across said screen at a substantially uniform rate upon the passage through said coil means of a substantially sawtooth current, means for applying to said control electrode a voltage corresponding to any non-linear components of said sawtooth in such manner as to increase the intensity of said electron beam in proportion to increased deflection rate caused by such non-linear components of said sawtooth, thereby effecting an increase in the intensity of the light at a given spot on said screen in response to increased rate of deflection to neutralize the effect of such increased deflection rate.

10. In a television receiver having a cathode ray tube provided with an electron beam source, a control electrode, a luminescent screen adapted to produce light when bombarded by an electron beam from said source, and electromagnetic coil means adapted to deflect said beam across said screen at a substantially uniform rate upon the passage through said coil means of a substantially sawtooth current, means for applying to said control electrode a voltage corresponding to any non-linear components of said sawtooth in such manner as to increase the intensity of said electron beam in proportion to increased deflection rate caused by such non-linear components of said sawtooth, thereby effecting an increase in the intensity of the light at a given spot on said screen in response to increased rate of deflection to neutralize the effect of such increased deflection rate, a resistor, one end of which is connected to ground, said last-named means including a capacitance connecting said deflection coils to the other end of said resistor, and a connection from the latter end of said resistor to said control electrode.

11. A television receiver which comprises: a first electronic tube adapted to be driven to cutoff by a portion of a wave form impressed on said tube; an electromagnetic deflection coil; means coupling said coil to said tube, whereby the output of said tube is adapted to be applied to said coil; a second electronic tube connected across the output circuit of said first tube and adapted to damp oscillations produced in said output circuit of said first electronic tube when said first tube is driven to cutoff, the output of said second electronic tube being adapted to flow through said coil; a cathode ray tube having a luminescent screen, a control electrode and means for causing a beam of electrons to pass through said control electrode and to impinge upon said screen, thereby producing on said screen a spot of light, the intensity of which is proportional to the intensity of said electron beam; means including said first and second electronic tubes for passing a substantially sawtooth current through said coil, whereby the electromagnetic flux from said coil is adapted to cause electron beam to traverse said screen at a velocity proportional to the rate of current change in said coils; and means coupling said coil to the control electrode of said cathode ray tube whereby high-frequency components of the voltage across said coil corresponding to said oscillations are adapted to be impressed upon said control electrode, whereby to vary the intensity of said electron beam in accordance with said oscillations in order to compensate for variations in the intensity of said light spot caused by said current oscillations in said coil.

12. A receiver as defined by claim 11 wherein said means for coupling said coil to said control electrode comprises a small capacitance adapted to pass only high-frequency voltages.

13. A receiver as defined by claim 12 wherein said last-named coupling means comprises a length of twin-lead transmission line and a resistor, said high-frequency voltage components being adapted to appear across said resistor.

14. A television receiver comprising a cathode ray tube having a control electrode; electromagnetic means for deflecting an electron beam in said tube; means for applying a substantially sawtooth waveform to said deflecting means, whereby said deflecting means may be caused to deflect said electron beam at a substantially linear rate; and coupling means for applying only high frequency components of the voltage corresponding to said waveform to said control electrode, whereby the intensity of said electron beam may be varied in proportion to the voltage applied to said control electrode.

15. A television receiver comprising a cathode ray tube having a control electrode; electromagnetic means for deflecting an electron beam in said tube; means for applying a substantially saw tooth waveform to said deflecting means, whereby said deflecting means may be caused to deflect said electron beam at a substantially linear rate; and coupling means for applying only non-linear components of the voltage corresponding to said waveform to said control electrode, whereby the intensity of said electron beam may be varied in proportion to the voltage applied to said control electrode.

References Cited in the file of this patent

UNITED STATES PATENTS

| | | |
|---|---|---|
| 2,416,200 | Nagel | Feb. 18, 1947 |
| 2,448,299 | Dorne | Aug. 31, 1948 |
| 2,567,861 | Silliman | Sept. 11, 1951 |
| 2,595,228 | Crist | May 6, 1952 |
| 2,671,182 | Havens et al. | Mar. 2, 1954 |
| 2,677,783 | Wilson | May 4, 1954 |
| 2,700,741 | Brown et al. | Jan. 25, 1955 |